(12) United States Patent
Cain et al.

(10) Patent No.: US 11,787,562 B2
(45) Date of Patent: Oct. 17, 2023

(54) SYSTEM AND METHOD FOR NET-CAPTURE OF UNMANNED AERIAL VEHICLE

(71) Applicant: Raytheon Company, Waltham, MA (US)

(72) Inventors: Jonathan A. Cain, Tucson, AZ (US); Michael J. Mahnken, Oro Valley, AZ (US); Dave S. Douglas, Marina del Rey, CA (US)

(73) Assignee: Raytheon Company, Waltham, MA (US)

( * ) Notice: Subject to any disclaimer, the term of this patent is extended or adjusted under 35 U.S.C. 154(b) by 337 days.

(21) Appl. No.: 17/161,482

(22) Filed: Jan. 28, 2021

(65) Prior Publication Data

US 2022/0234756 A1 Jul. 28, 2022

(51) Int. Cl.
| | |
|---|---|
| *B64F 1/20* | (2006.01) |
| *B64F 1/02* | (2006.01) |
| *B64C 39/02* | (2023.01) |
| *B64D 45/08* | (2006.01) |
| *G01S 3/782* | (2006.01) |
| *B64U 70/30* | (2023.01) |

(52) U.S. Cl.
CPC .............. *B64F 1/20* (2013.01); *B64C 39/024* (2013.01); *B64D 45/08* (2013.01); *B64F 1/027* (2020.01); *B64U 70/30* (2023.01); *G01S 3/782* (2013.01)

(58) Field of Classification Search
CPC .. B64F 1/027; B64F 1/029; B64F 1/20; B64F 1/18; B64D 45/08; B64U 70/30; B64U 70/95; B64C 2201/182
See application file for complete search history.

(56) References Cited

U.S. PATENT DOCUMENTS

| | | | |
|---|---|---|---|
| 5,716,032 A | * | 2/1998 | McIngvale ............ B64C 39/024 244/187 |
| 8,375,837 B2 | | 2/2013 | Goossen et al. |
| 8,532,846 B2 | | 9/2013 | Tollenaere et al. |

(Continued)

FOREIGN PATENT DOCUMENTS

| | | |
|---|---|---|
| CN | 109573088 | 4/2019 |
| DE | 102015003323 A1 | 9/2016 |

(Continued)

OTHER PUBLICATIONS

International Search Report and Written Opinion dated Oct. 13, 2021 in corresponding International Application No. PCT/US2021/027599.

*Primary Examiner* — Joshua J Michener
*Assistant Examiner* — Arfan Y. Sinaki
(74) *Attorney, Agent, or Firm* — Renner, Otto, Boisselle, & Sklar

(57) ABSTRACT

A system and method for capturing an unmanned aerial vehicle includes a net configured to receive the unmanned aerial vehicle, an infrared emitter arrangement including a plurality of infrared emitters arranged around the net, an infrared sensor mounted to the unmanned aerial vehicle and configured to detect the infrared emitter arrangement, and a processor that is in communication with the infrared sensor and configured to adjust an azimuth and elevation of the unmanned aerial vehicle based on the detected infrared emitter arrangement in a field-of-view of the infrared sensor.

19 Claims, 3 Drawing Sheets

(56) References Cited

U.S. PATENT DOCUMENTS

| | | |
|---|---|---|
| 8,783,607 B2 | 7/2014 | Allen et al. |
| 9,085,362 B1 | 7/2015 | Kilian et al. |
| 10,005,556 B2 | 6/2018 | Rastgaar Aagaah et al. |
| 10,435,153 B2 | 10/2019 | Klein |
| 2006/0125658 A1* | 6/2006 | Dohler .................. B64F 1/20 244/186 |
| 2015/0001340 A1* | 1/2015 | Allen .................. B64F 1/025 244/110 C |
| 2016/0137311 A1* | 5/2016 | Peverill .................. B60L 53/14 701/16 |
| 2016/0257424 A1* | 9/2016 | Stabler .................. B64C 39/02 |
| 2017/0129603 A1* | 5/2017 | Raptopoulos ........ G08G 5/0069 |
| 2018/0373270 A1* | 12/2018 | Lopez .................. G08G 5/0013 |
| 2019/0248509 A1* | 8/2019 | Cohen .................. B64F 1/027 |

FOREIGN PATENT DOCUMENTS

| | | | | |
|---|---|---|---|---|
| GB | 2093414 A | * | 9/1982 | ................ B64F 1/02 |
| KR | 102083934 | | 3/2020 | |
| WO | 2015108588 | | 7/2015 | |
| WO | 2017083406 | | 5/2017 | |

* cited by examiner

SYSTEM AND METHOD FOR NET-CAPTURE OF UNMANNED AERIAL VEHICLE

FIELD OF DISCLOSURE

The disclosure relates to a system and method for capturing an unmanned aerial vehicle.

DESCRIPTION OF THE RELATED ART

Various applications may require capturing of fixed-wing unmanned aerial vehicles (UAVs). For example, testing fixed-wing UAVs may include capturing the UAVs without damaging the UAV due to the cost of expending UAVs and to meet predetermined time tables for testing the UAVs. Some UAVs may also carry payloads that are not expendable or expensive to replace. Prior attempts to capture fixed-wing UAVs include using global positioning systems (GPS) and operator remote control. However, operator remote control may be ineffective for autonomous missions of a UAV or when the UAV is out of a communication range of the operator. For example, the UAV may travel into a GPS-denied environment in which GPS of the UAV may not be used to control the UAV.

SUMMARY OF DISCLOSURE

The present application provides a system and method for capturing a fixed-wing unmanned aerial vehicle (UAV) that uses an infrared emitter arrangement. The infrared emitter arrangement includes infrared emitters that are arranged around a net. The UAV includes an infrared sensor that is configured to detect the infrared emitter arrangement to initiate the terminal flight of the UAV in which the UAV travels toward the net for capture. When the infrared emitter arrangement is detected, the UAV enters a guidance mode in which corrections are made to the UAV to adjust at least one of an elevation or an azimuth to ensure the UAV flies into the net. The corrections are made using algorithms that are stored in the UAV processor and configured to be executed based on the detected infrared emitter arrangement in a field-of-view of the infrared sensor.

The corrections to the UAV may include changing the heading of the UAV depending on the infrared emitters of the infrared emitter arrangement that are seen in the field-of-view of the sensor. The algorithms used may be in a roll-corrected frame of reference such that corrections in elevation and azimuth may command the UAV to make corrections in yaw, pitch, and roll. If only some of the infrared emitters are seen in the field-of-view at a point during the terminal flight, the UAV may receive a correction until all of the infrared emitters are seen in the field-of-view. The algorithms for adjusting the elevation or azimuth of the UAV are stored in guidance and signal processing logic of the UAV processor. The system is advantageous in that the UAV is adjusted to capture the entire infrared emitter arrangement within the field-of-view of the infrared sensor to ensure that the UAV is captured in the net.

The infrared emitters may be light sources or thermal sources and one of the infrared emitters is a reference infrared emitter arranged behind the net. The net may be tilted. A plurality of infrared emitters may be arranged at corners of the net to define the shape of the net for detection by the UAV. The reference infrared emitter may be arranged in a housing having a shutter for obfuscating the reference infrared emitter during the initial detection to determine where the infrared emitter arrangement is in the field-of-view, e.g. where the upper and lower infrared emitters are or where the left and right side infrared emitters are.

The system may also be configured to make elevation or azimuth corrections to a gimbal if the sensor is mounted to a nose of the UAV by a gimbal. The sensor may include a fix-post camera or a gimballed arrangement. The corrections to the gimbal may be made to put the reference infrared emitter of the infrared emitter arrangement in a boresight of the sensor after the initial detection of the infrared emitter arrangement.

According to an aspect of the disclosure, a system for capturing a UAV may include a net having an infrared emitter arrangement and an infrared sensor mounted to the UAV.

According to an aspect of the disclosure, a system for capturing a UAV may be configured to adjust at least one of an azimuth or an elevation of the UAV based on a detected infrared emitter arrangement in a field-of-view of a sensor.

According to an aspect of the disclosure, a system for capturing a UAV may include a net having an infrared emitter arrangement formed by a reference infrared emitter and infrared emitters arranged at corners of the net.

According to an aspect of the disclosure, a system for capturing a UAV may be configured to adjust at least one of an azimuth or an elevation of a gimbal for an infrared sensor mounted to the UAV based on a detected infrared emitter arrangement in a field-of-view of the sensor.

According to an aspect of the disclosure, a method for capturing a UAV may include capturing images of an infrared emitter arrangement arranged proximate a net.

According to an aspect of the disclosure, a method for capturing a UAV may include adjusting at least one of an azimuth or elevation of UAV based on a detected infrared emitter arrangement in a field-of-view of an infrared sensor.

According to an aspect of the disclosure, a system for capturing an unmanned aerial vehicle includes a net configured to receive the unmanned aerial vehicle, an infrared emitter arrangement including a plurality of infrared emitters arranged around the net, an infrared sensor mounted to the unmanned aerial vehicle and configured to detect the infrared emitter arrangement, and a processor that is in communication with the infrared sensor and configured to adjust at least one of an azimuth or an elevation of the unmanned aerial vehicle based on the detected infrared emitter arrangement in a field-of-view of the infrared sensor.

According to an embodiment of any paragraph(s) of this summary, each of the plurality of infrared emitters may be a light source or a thermal source.

According to an embodiment of any paragraph(s) of this summary, the system may include a power source configured to heat each of the plurality of infrared emitters to produce a predetermined amount of thermal emissivity for detection by the infrared sensor.

According to an embodiment of any paragraph(s) of this summary, the plurality of infrared emitters may include a reference infrared emitter arranged behind the net relative to a capturing face of the net and configured to be captured in the field-of-view of the infrared sensor.

According to an embodiment of any paragraph(s) of this summary, the reference infrared emitter may be arranged in a housing having a shutter for obfuscating the reference infrared emitter from the infrared sensor for predetermined intervals.

According to an embodiment of any paragraph(s) of this summary, the plurality of infrared emitters may include two or more infrared emitters that are spaced relative to the reference infrared emitter.

According to an embodiment of any paragraph(s) of this summary, the two or more infrared emitters may include four infrared emitters that are each arranged at a different corner of the net.

According to an embodiment of any paragraph(s) of this summary, the net may be tilted relative to a vertical orientation.

According to an embodiment of any paragraph(s) of this summary, the processor may be configured to determine a slant range between the unmanned aerial vehicle and the net based on the field-of-view and distances between the plurality of infrared emitters.

According to an embodiment of any paragraph(s) of this summary, the processor may be configured to adjust at least one of a yaw, pitch, or roll of the unmanned aerial vehicle based on the determined slant range.

According to an embodiment of any paragraph(s) of this summary, the processor may include guidance and signal processing logic for determining the slant range and adjusting the azimuth or the elevation of the unmanned aerial vehicle.

According to an embodiment of any paragraph(s) of this summary, the net may include logic configured to control the infrared emitter arrangement.

According to an embodiment of any paragraph(s) of this summary, the system may include a gimbal arranged to mount the infrared sensor to a nose of the unmanned aerial vehicle.

According to an embodiment of any paragraph(s) of this summary, the processor may be configured to adjust at least one of an elevation or an azimuth of the gimbal to put a reference infrared emitter of the plurality of infrared emitters in boresight.

According to an embodiment of any paragraph(s) of this summary, the infrared sensor may be configured to view the infrared emitter arrangement for a predetermined number of frames before the processor adjusts the azimuth or the elevation.

According to another aspect of the disclosure, a method for capturing an unmanned aerial vehicle in a net includes detecting an infrared emitter arrangement arranged proximate the net in a field-of-view of an infrared sensor arranged on the unmanned aerial vehicle, and adjusting at least one of an azimuth or elevation of the unmanned aerial vehicle based on the detected infrared emitter arrangement in the field-of-view.

According to an embodiment of any paragraph(s) of this summary, the method may include determining a slant range between the unmanned aerial vehicle and the net based on the field-of-view of the infrared sensor and distances between the plurality of infrared emitters.

According to an embodiment of any paragraph(s) of this summary the method may include adjusting at least one of a yaw, pitch, or roll of the unmanned aerial vehicle based on the determined slant range.

According to an embodiment of any paragraph(s) of this summary, the method may include adjusting at least one of an elevation or azimuth of a gimbal and sensor arrangement on the unmanned aerial vehicle to put a reference infrared emitter of the infrared emitter arrangement in boresight after an initial detection of the infrared emitter arrangement.

According to an embodiment of any paragraph(s) of this summary, the method may include obfuscating the reference infrared emitter for predetermined intervals during detection to determine a position of the infrared emitter arrangement in the field-of-view.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description of the disclosure when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein may be used in applications that implement unmanned aerial vehicles (UAVs). Small UAVs may be suitable, such as fixed-wing UAVs having a wingspan less than 3.6 meters (12 feet). Larger UAVs may also be suitable in some applications. The UAV may be tube-launched and capable of performing surveillance imagery, targeting, near real-time damage assessment, and identification and elimination of threat UAVs. Any suitable platform may be used to launch the UAV, such as a land vehicle, sea vessel, aircraft, or spacecraft. Exemplary applications for the UAV may include targeting assistance, perimeter security, and research missions. Military and non-military application may be suitable. In an exemplary application, the system described herein may be used for testing a fixed-wing UAV and capturing the UAV without damaging the UAV prior to executing a mission.

Figure 1:
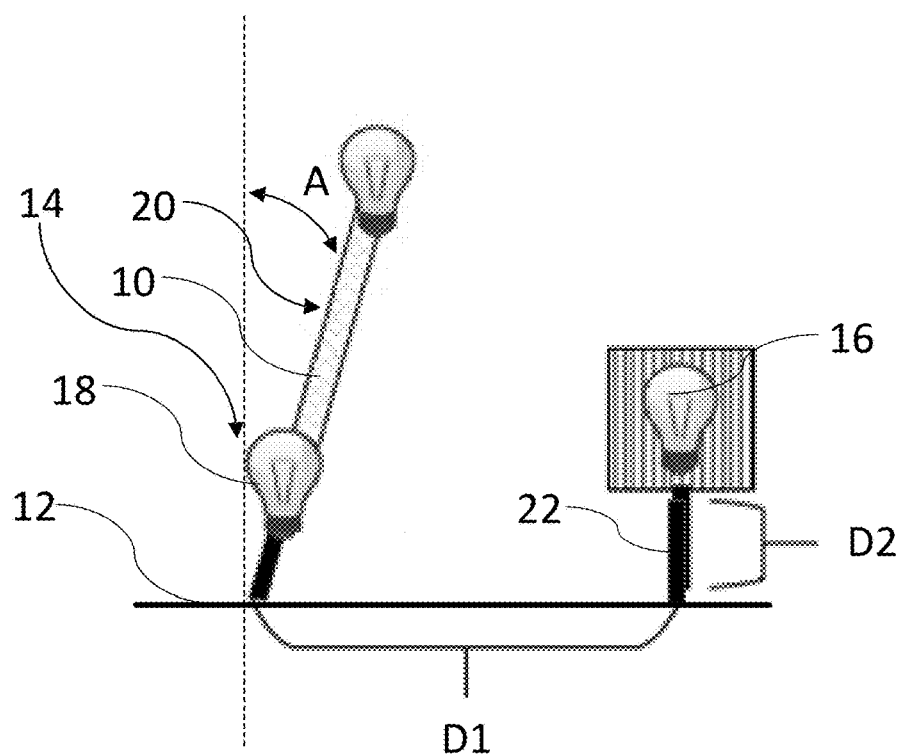
FIG. 1 shows a side view of a net for capturing an unmanned aerial vehicle (UAV) and an infrared emitter arrangement arranged around the net.
Figure 2:
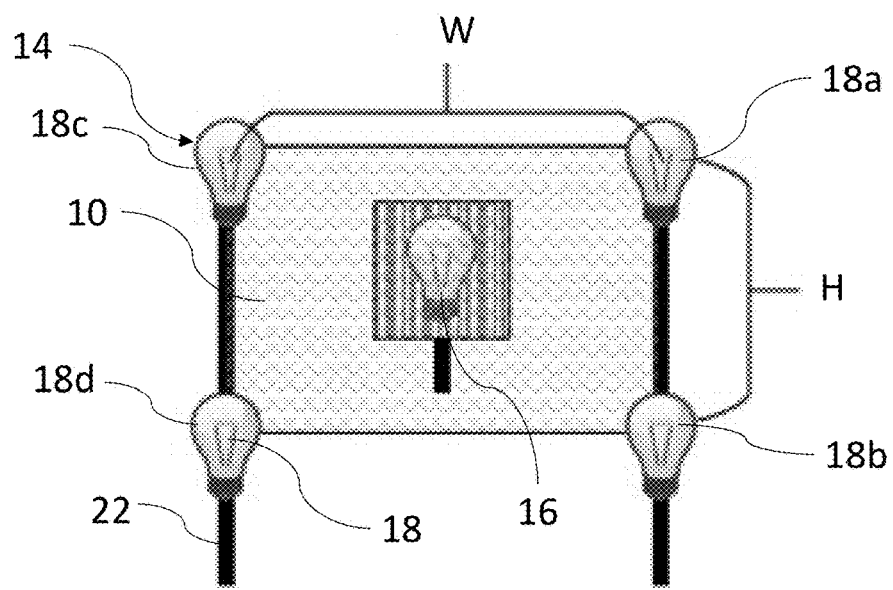
FIG. 2 shows a front view of the net and infrared emitter arrangement of FIG. 1.

Referring first to FIGS. 1 and 2, a net 10 for capturing a UAV is shown. The net 10 may be formed of braided nylon or any other suitable material for capturing the UAV without damaging the UAV. The width W of the net 10 may be longer than the height H of the net 10 and the net 10 may be rectangular in shape. Other shapes of the net 10 may be suitable for other applications. In an exemplary embodiment, the net 10 may have a width W that is between 63.5 and 88.9 centimeters (between 25 and 35 inches) and a height H that is between 50.8 and 76.2 centimeters (between 20 and 30 inches). The net 10 may be arranged on a surface 12 and mounted above the surface 12. The surface 12 may be a ground surface or another stationary surface. In other exemplary embodiments, the surface 12 may be movable, such as on a movable platform.

An infrared emitter arrangement 14 is arranged proximate the net 10 and may be mounted to the net 10. The infrared emitter arrangement 14 includes a plurality of infrared emitters 16, 18 arranged around the net 10. The plurality of infrared emitters 16, 18 includes a reference infrared emitter 16 arranged behind the net 10. Two or more infrared emitters 18, 18a, 18b, 18c, 18d may be spaced relative to the reference infrared emitter 16. The two or more infrared emitters 18 may include four infrared emitters 18a, 18b, 18c, 18d that are each arranged at a different corner of the net 10 such that the infrared emitters 18 define the shape of the net 10 for detection by the UAV. The upper infrared emitters 18a, 18c are spaced by the width W of the net 10 and the upper infrared emitters 18a, 18c are spaced from the lower infrared emitters 18b, 18d by the height H of the net 10. The reference infrared emitter 16 may be arranged proximate a center of the net 10. In other exemplary embodiments, the reference infrared emitter 16 may be arranged at any location along the net 10.

Any suitable infrared light source or thermal source may be used for each of the infrared emitters 16, 18. In an exemplary embodiment, the infrared emitters 16, 18 may include 500-watt halogen bulbs and the UAV may include a long-wave infrared sensor. Any number of infrared emitters 16, 18 may be used. Four infrared emitters 18 and one reference infrared emitter 16 may be suitable. Fewer than four or more than four infrared emitters 18 may be suitable in some applications. The arrangement of the infrared emitters 16, 18 may be symmetrical.

The reference infrared emitter 16 may be arranged behind the net 10 relative to a capturing face 20 of the net 10 that faces the UAV. The net 10 and the reference infrared emitter 16 may be spaced by a distance D1. In exemplary embodiments, the distance D1 may be between 4.5 and 7.6 meters (between 15 and 25 feet). The reference infrared emitter 16 may be mounted above the surface 12 by a distance D2. For example, the distance D2 may be between 2.1 and 3.4 meters (between 7 and 11 feet). Many other dimensions may be suitable.

The net 10 may be tilted relative to a vertical orientation relative to the surface 12 by an angle A that is between zero and 15 degrees. In exemplary embodiments, the angle A may be approximately 10 degrees. Accordingly, the infrared emitters 18 arranged on the net 10 may be tilted with the net 10 whereas the reference infrared emitter 16 may be mounted in a vertical orientation behind the net 10. Each of the infrared emitters 16, 18 may be held in position above the surface 12 by a pole 22. The arrangement of the net 10 and the infrared emitter arrangement 14 described herein are exemplary and other configurations of the infrared emitters 16, 18 may be suitable for certain applications.

Figure 3:
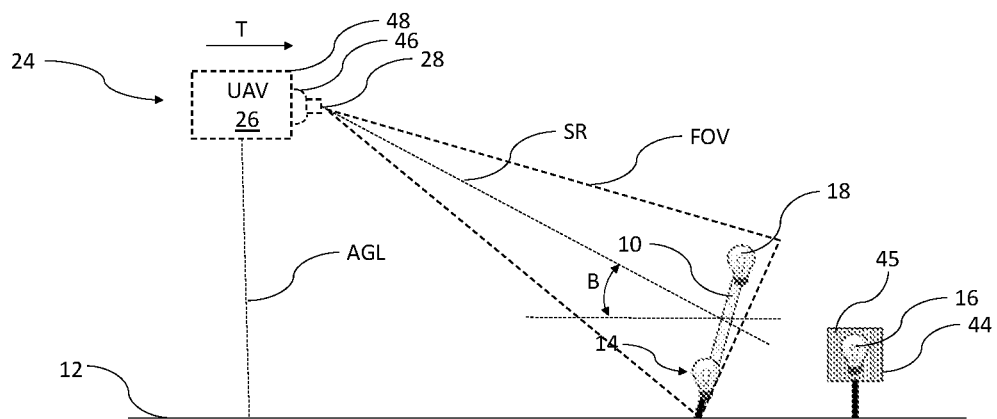
FIG. 3 shows a system for capturing the UAV that includes the net and infrared emitter arrangement of FIG. 1 and an infrared sensor mounted on the UAV.
Figure 4:
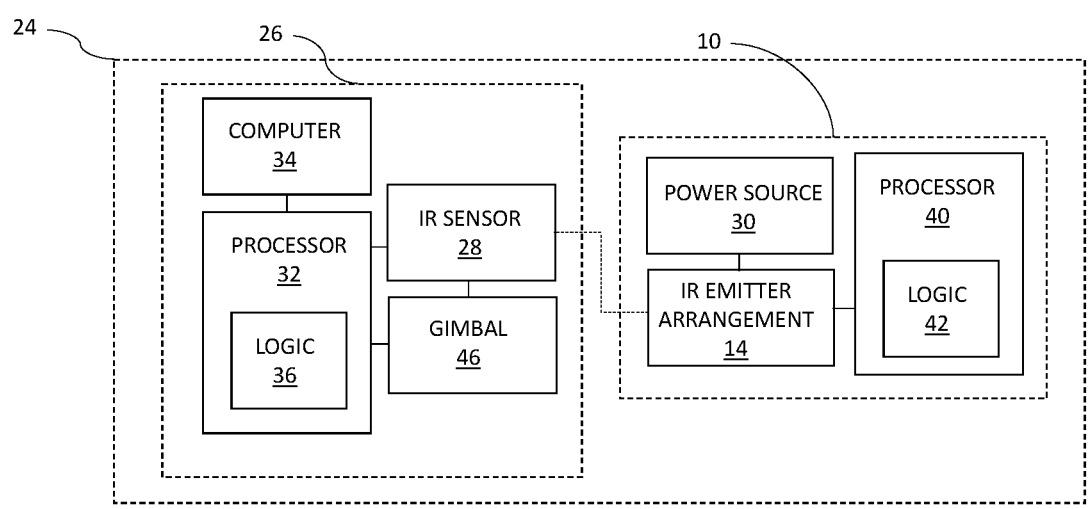
FIG. 4 shows a schematic drawing of the system for capturing the UAV of FIG. 3.

Referring in addition to FIGS. 3 and 4, a system 24 for capturing a UAV 26 includes the net 10, the infrared emitter arrangement 14, and an infrared sensor 28 mounted to the UAV 26 and configured to detect the infrared emitter arrangement 14. The UAV 26 travels in a direction T toward the net 10. The infrared sensor 28 may detect the infrared emitter arrangement 14 when the UAV 26 is within a predetermined range of the net 10 and the infrared emitter arrangement 14, such that the UAV 26 begins its terminal flight for net capture of the UAV 26. During the terminal flight, the engine of the UAV 26 may be turned off and the UAV 26 may be switched into a guidance mode in which the system 24 is used to adjust the elevation or azimuth of the UAV 26 to ensure the UAV 26 flies directly into the net 10.

The predetermined range at which the UAV 26 begins its terminal flight may be defined by the UAV 26 having a slant range SR and above ground level (AGL) relative to the net 10. The AGL may be between 25 and 50 meters. The UAV 26 may have a maximum speed of 45 meters per second and a stall speed of 20 meters per second. At the predetermined slant range SR and the predetermined above ground level AGL, such as at a slant range SR of approximately 200 meters and an above ground level AGL of approximately 50 meters, the UAV 26 may begin its terminal flight. The UAV 26 may thus have an ingress angle B relative to the net 10 of approximately 30 degrees and an angle of attack of approximately three degrees. Other slant ranges and AGLs may also define the range in which the UAV 26 begins its terminal fight.

For the initial detection of the infrared emitter arrangement 14, the system 24 includes a power source 30 arranged proximate the net 10 for heating the infrared emitter arrangement 14. Power may be supplied to the thermal sources of each of the infrared emitters 16, 18 until the measured temperature exceeds 250 degrees Celsius, or any other predetermined temperature. The infrared emitters 16, 18 may then produce enough thermal emissivity to be treated as a black body from one to 13.5 microns. The infrared emitters 16, 18 may be configured to produce any suitable thermal emissivity for detection by the infrared sensor 28 of the UAV 26.

After the initial detection of the infrared emitter arrangement 14, the UAV enters the guidance mode in which corrections are made based on the infrared emitters 16, 18 that are seen in the field-of-view of the infrared sensor 28. The system 24 includes a processor 32 arranged in the UAV 26 that is in communication with the infrared sensor 28 of the UAV 26 and configured to adjust at least one of an azimuth or elevation of the UAV 26. The infrared sensor 28 continuously captures images of the infrared emitter arrangement 14 such that the corrections to the UAV 26 are made based on changes in the position of the infrared emitter arrangement 14 that are seen in the captured images and indicate that the UAV 26 should be adjusted to maintain all of the infrared emitters 16, 18 in the field-of-view. Advantageously, the corrections made to the UAV 26 ensure that the position and orientation of the UAV 26 is suitable for capture as the UAV 26 travels toward the net 10.

The infrared sensor 28 includes a camera for capturing images of the infrared emitter arrangement 14. The camera may have a microbolometer that is configured to detect longwave infrared having a 7.5 to 13.5 micron wavelength, or any other thermal emissivity produced by the infrared emitters 16, 18. The infrared sensor 28 may include any suitable lens. In an exemplary embodiment, the lens may have a focal length of approximately 18 millimeters, a nominal horizontal field-of-view of approximately 24.4 degrees, and a nominal vertical field-of-view of approximately 19.5 degrees. The infrared sensor 28 may have any suitable frame rate for capturing images of the infrared emitter arrangement 14, such as a frame rate configured at approximately 30 hertz. The frame rate may be variable. Other configurations of the infrared sensor 28 may be suitable. One or more sensors 28 may be used depending on the application.

The processor 32 includes signal processing algorithms and is configured to receive the data, e.g. the captured images, from the infrared sensor 28 and execute the algorithms to make the corrections to the UAV 26. When the infrared emitters 16, 18 are treated as black bodies, there is enough contrast with the surrounding area around the net 10 that enables the algorithms of the processor 32 to perform. The processor 32 may be connected to a mission computer 34. For example, the processor 32 may be connected to the mission computer 34 for the UAV 26 via an Ethernet switch on a circuit board that houses the mission computer 34 and guidance, navigation, and control (GNC) algorithms for the UAV 26.

The processor 32 includes an Inertial Navigation System (INS) including the guidance and signal processing logic 36 that stores the signal processing algorithms. The guidance and signal processing logic 36 is configured to execute algorithms such as determining the slant range SR and sending commands to adjust the UAV 26. The mission computer 34 may be configured to receive the commands from the INS to make the corrections to the UAV 26, such as an elevation and azimuth correction. The corrections to the UAV 26 may include changing the heading of the UAV 26 depending on the infrared emitters of the infrared emitter arrangement 14 that are seen in the field-of-view FOV of the sensor 28. The algorithms used may be in a roll-corrected frame of reference such that corrections in elevation and azimuth may command the UAV 26 to make corrections in yaw, pitch, and roll. The processor 32 and mission computer 34 may include any suitable circuitry, microprocessors, controllers, etc.

During the terminal flight of the UAV 26, if all of the infrared emitters 16, 18 are seen in the field-of-view FOV of the infrared sensor 28, the guidance and signal processing logic 36 is configured to determine the slant range SR throughout the terminal flight based on the field-of-view FOV of the infrared sensor 28 and the fixed distances between the infrared emitters 16, 18, such as the widths W and heights H shown in FIG. 2. The guidance and signal processing logic 36 is then able to send commands to the UAV 26 pertaining to a pitch adjustment for the UAV 26 based on the determined slant range SR.

Alternatively, during the terminal flight, the infrared sensor 28 may only see the infrared emitters 18*a*, 18*b* or the infrared emitters 18*c*, 18*d* on one side of the net 10 such that the UAV 26 is heading toward the net 10 too far to the left or too far to the right of the net 10. If the reference infrared emitter 16 is present in the field-of-view FOV, the slant range SR and the known distances between the infrared emitters 18, e.g. the widths W and the heights H, are used to steer the UAV 26 to the left or right, e.g. make a yaw correction to the UAV 26. Similarly, if the UAV 26 is heading toward the net 10 too far above or too far below the net 10, a pitch correction may be made to the UAV 26 to steer the UAV 26 up or down.

The net 10 also includes a processor 40 and logic 42 to control the infrared emitter arrangement 14. Once the infrared emitter arrangement 14 is initially detected, the reference infrared emitter 16 may be arranged in a box 44 having a shutter 45 to obfuscate the reference infrared emitter 16 from the infrared sensor 28 for a predetermined number of frames. The reference infrared emitter 16 is arranged proximate the center of the net 10 or anywhere along the net 10 that is in the field-of-view FOV of the infrared sensor 28. After the initial detection, the processor 40 and logic 42 may be configured to operate the shutter to obfuscate the reference infrared emitter 16 from the infrared sensor 28 for two consecutive frames during every four consecutive frames. The flickering reference infrared emitter 16 provided by the shutter is used to determined which infrared emitters 18*a*, 18*b*, 18*c*, 18*d* are being viewed in the field-of-view FOV of the infrared sensor 28. For example, as shown in FIG. 2, the infrared sensor 28 may only view right side infrared emitters 18*a*, 18*b*, top infrared emitters 18*a*, 18*c*, left infrared emitters 18*c*, 18*d*, or bottom infrared emitters 18*b*, 18*d*.

The UAV 26 may travel to a specific distance relative to the infrared emitter arrangement 14 at which the detected infrared emitters 18*a*, 18*b*, 18*c*, 18*d* may be resolved and determined by the processor 32. The infrared sensor 28 may be configured to view the infrared emitter arrangement 14 for a predetermined number of frames, such as for approximately 30 frames, before the processor 32 of the UAV 32 executes the correction algorithms. Viewing the infrared emitter arrangement 14 for the predetermined number of frames ensures that accurate input measurements are taken before corrections to the UAV 26 are made.

In exemplary embodiments of the infrared sensor 28, any suitable gimbal 46 may be used to mount the infrared sensor 28 to the UAV 26. In other exemplary embodiments, the infrared sensor 28 may include a fix-post camera. The gimbal 46 may be mounted at a front or nose end 48of the UAV 26 that faces forward relative to the direction of travel T of the UAV 26. After the initial detection for the predetermined number of frames, the processor 32 may then send a command to the mission computer 34 to adjust at least one of an elevation or azimuth of the gimbal 46 to put the reference infrared emitter 16 in boresight. The gimballed infrared sensor 28 may be configured to initially point at predetermined a latitude, longitude, and altitude (LLA) of the net 10, such that an appropriate correction is then made to the gimbal 46. Accordingly, the system 24 is configured to make both corrections to the angles of the gimbal 46, and to the position and orientation of the UAV 26.

During operation of the system 24, the ingress angle B of the UAV 26 relative to the net 10 may be normal relative to a reference frame of the infrared emitters 16, 18 in the infrared emitter arrangement 14, as shown in FIG. 3. If the ingress angle B is skewed, then the processor 32 may be configured to perform an affine transformation on the detected infrared emitters 16, 18, based on the known distances between the infrared emitters 16, 18, to derive an angle-angle-range that is normal to the net 10. The affine transformation occurs when the image of the net 10 is skewed, such that the projection of the net 10 is rotated or translated into a projection that is not skewed, e.g. when the infrared sensor 28 and the net 10 are parallel, using the predetermined dimensions of the net 10. The rotation of the projection is the affine transformation and the output of the transformation includes the elevation and azimuth angles and slant range. The processor 32 may be configured to make corrections for the ingress angle B of the UAV 26 using the affine transformation and subsequent corrections to the UAV 26 may be made relative to the ingress angle B, such as pitch corrections. The affine transformation corrections made to the UAV 26 may be performed without using attitude information for the UAV 26.

Alternatively, attitude information for the UAV 26 may be used to make corrections to the UAV 26. For example, measurements from the gimbal 46 and the INS of the processor 32 may be used to make corrections for the UAV 26. At the outset, the slant range SR of the UAV 26 for a predetermined pixel resolution R of the infrared sensor 28 may be determined using equation (1):

$$SR = \frac{d}{R \cdot IFOV} \qquad \text{Equation (1)}$$

In equation (1), the slant range SR is determined based on the distance d between the infrared emitters 16, 18 and the instantaneous field-of-view FOV IFOV. The distance d is known. For example, the width W and height H between the infrared emitters 18 is shown in FIG. 2. The slant range SR is determined in every frame of the infrared sensor 28 where two of the infrared emitters 14 arranged along a common side of the net 10 are present in the field-of-view FOV of the infrared sensor 28. If all of the infrared emitters 16, 18 are shown in the field-of-view FOV, the slant range SR may be used to adjust a pitch of the UAV 26. The resolution is determined by pixel rows n multiplied by pixel columns m.

In an exemplary scenario in which all of the infrared emitters 14 are present in a first capture frame N and a second capture frame N+1, an elevation correction may be made for the gimbal 46 and from the processor 32 (INS) to the mission computer 34 to adjust the UAV 26. For example, the correction may be a change in pitch of the UAV 26 performed by the mission computer 34.

From frame N to frame N+1, a change or adjustment in position $\Delta N$, $\Delta E$, $\Delta D$ of the UAV 26 by the processor 32 may be made, and a change in orientation $\Delta \theta$, $\Delta \phi$, $\Delta \psi$ of the UAV 26 by the processor 32 may be made. The changes are based on the center of the four corners of the net 10 being defined by $x_c, y_c$. The image of the net 10 captured by the infrared sensor 28 may be moved by $\Delta y_c = y_{N+1} - y_N$ pixels from frame N to frame N+1. The correction for the UAV 26 received from the INS of the processor 32 may be determined using equation (2):

$$\Delta y_{ia} = \frac{n\tan(\phi_{N+1} + \epsilon_{ia})}{2 \cdot \tan(FOV/2)} - \frac{n\tan(\phi_N + \epsilon_{ia})}{2 \cdot \tan(FOV/2)} \qquad \text{Equation (2)}$$

In equation (2), n corresponds to the pixel row for the resolution. If there is a change in the scene by elevation, then the row n space may be corrected. The correction in angle $\Delta y_{ia}$ for the UAV 26 is also determined based on frame-to-frame angular error $\epsilon_{ia}$ from the INS, i.e. measurement noise.

In an exemplary embodiment in which the infrared sensor 28 is mounted to the UAV 26 by the gimbal 46, from frame N to frame N+1, a change in gimbal angles $\Delta\alpha$, $\Delta\beta$, $\Delta\gamma$ may be made. A correction for the gimbal 46 for the infrared sensor 28 may be determined using equation (3):

$$\Delta y_g = \frac{n\tan(\beta_{N+1} + \epsilon_g)}{2 \cdot \tan(FOV/2)} - \frac{n\tan(\beta_N + \epsilon_g)}{2 \cdot \tan(FOV/2)} \qquad \text{Equation (3)}$$

In equation (3), the gimbal correction $\Delta y_g$ is determined based on frame-to-frame angular error $\epsilon_g$ from the gimbal 46, i.e. measurement noise. Accordingly, the entire elevation correction for the UAV 26 to obtain an image of the net 10 that is in the same position as in the focal plane in frame N may be determined by adding the change in image capture $\Delta y_c$, the UAV correction $\Delta y_{ia}$, and the gimbal correction $\Delta y_g$, using equation (4):

$$el\ \text{correction} = \Delta y_c + \Delta y_{ia} + \Delta y_g \qquad \text{Equation (4)}$$

In another exemplary scenario in which all of the infrared emitters 18 are present in frame N and none of the infrared emitters 18 are present in frame N+1, an azimuth correction for the UAV 26 may be made. For example, the correction may be a change in yaw of the UAV 26 performed by the mission computer 34. The correction in angle for the UAV 26 from the INS may be determined using equation (5):

$$\Delta x_{ia} = \frac{m\tan(\psi_{N+1} + \epsilon_{ia})}{2 \cdot \tan(FOV/2)} - \frac{m\tan(\psi + \epsilon_{ia})}{2 \cdot \tan(FOV/2)} \qquad \text{Equation (5)}$$

In equation (5), m corresponds to the pixel column for the resolution. If there is a change in the scene by elevation, then the column m space may be corrected. The correction in angle $\Delta x_{ia}$ is also determined based on frame-to-frame angular error $\epsilon_{ia}$ from the INS. The correction in position for the UAV 26 from the INS may be determined using equation (6):

$$\Delta x_{ip} = \frac{\Delta E + 0.5\epsilon_{ip}}{IFOV \cdot (SR_N + v/FR)} \qquad \text{Equation (6)}$$

In equation (6), the correction in position $\Delta x_{ip}$ is based on the slant range $SR_N$ at frame N, the average velocity v of the UAV 26, the frame rate FR, and the change in position $\Delta E$ of the UAV 26, which is equal to $E_{N+1} - E_N$. The change in position $\Delta E$ of the UAV 26 is defined by the UAV's change in position in the reference frame east direction relative to the normal direction of the net 10 from frame N to frame N+1. The azimuth correction for the gimbal 46 may be determined using equation (7):

$$\Delta x_g = \frac{m\tan(\gamma_{N+1} + \epsilon_g)}{2 \cdot \tan(FOV/2)} - \frac{m\tan(\gamma_N + \epsilon_g)}{2 \cdot \tan(FOV/2)} \qquad \text{Equation (7)}$$

In equation (7), the gimbal correction $\Delta x_g$ is determined based on frame-to-frame angular error $\epsilon_g$ from the gimbal 46. The total azimuth correction for the UAV 26 may be determined by adding the UAV angle correction $\Delta x_{ip}$, the UAV position correction $\Delta x_{ip}$, and the gimbal correction $\Delta x_g$, using equation (8):

$$az\ \text{correction} = \Delta x_{ia} + \Delta x_{ip} + \Delta x_g \qquad \text{Equation (8):}$$

In still another exemplary scenario in which all of the infrared emitters 18 are present in frame N and only two of the infrared emitters 14 are present in frame N+1, an azimuth correction to the UAV 26 may be made by the processor 32. For example, if $\Delta x_{ia} + \Delta x_{ip} + \Delta x_g$ of equation (8) is positive, then the net 10 is moved to the right so that infrared emitters 18a, 18b on the right side of the net 10 (shown in FIG. 2) are outside the field-of-view FOV of the infrared sensor 28. Accordingly, equations (2) through (4) may be used to determine the difference $\Delta x$ in pixels of the left lights 18c, 18d (shown in FIG. 2) from frame N to frame N+1, via equation (9):

$$az\ \text{correction} = \Delta x + x_{ia} + x_g \qquad \text{Equation (9):}$$

Equation (9) is used if the correction from the focal plane measurement $\Delta x$ is more accurate than a measurement from the INS for the position correction $\Delta x_{ip}$. In an exemplary operation, the system may first execute equations (2) through (4) pertaining to the elevation correction scenario. If equations (2) through (4) are not executed, equation (9) pertaining to the azimuth correction scenario is executed. If the elevation correction and azimuth correction equation (9) are not executed, then the other azimuth correction equations (5) through (8) are executed. Other scenarios may be possible and similar equations (algorithms) may be used to make the suitable corrections to the UAV 26 and the gimbal 46. All of the algorithms may be carried out using the processor 32 in which the algorithms are stored.

Figure 5:
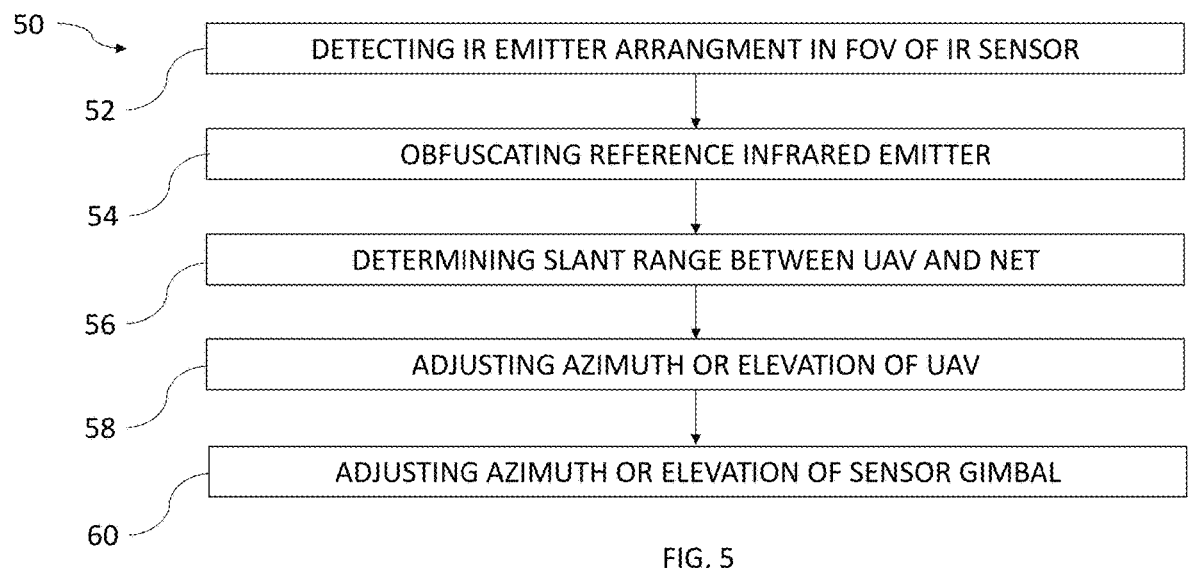
FIG. 5 shows a flowchart of a method for capturing an unmanned aerial vehicle in a net.

Referring now to FIG. 5, a flowchart showing a method 50 for capturing an unmanned aerial vehicle in a net is shown. The method 50 may include the system 24 shown in FIGS. 1-4. Step 52 of the method 50 includes detecting an infrared emitter arrangement 14 arranged proximate the net 10 in a field-of-view FOV of an infrared sensor 28 arranged on the UAV 26. Step 54 of the method 50 may include obfuscating the reference infrared emitter 16 of the infrared emitter arrangement 14 for predetermined intervals during detection to determine a position of the infrared emitter arrangement 14 in the field-of-view FOV.

Step 56 of the method 50 may include determining a slant range SR between the UAV 26 and the net 10 based on the field-of-view FOV of the infrared sensor 28 and the distances W, H between the plurality of infrared emitters 18. Step 58 of the method 50 includes adjusting at least one of an azimuth or elevation of the UAV 26 based on the detected infrared emitter arrangement 14 in the field-of-view FOV. Step 58 may include adjusting at least one of a yaw, pitch, or roll of the UAV based on the determined slant range SR. Step 60 of the method 50 may include adjusting at least one of an elevation or azimuth of a gimbal 46 for the infrared sensor 28 to put the reference infrared emitter 16 in boresight after an initial detection of the infrared emitter arrangement 14.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A system for capturing an unmanned aerial vehicle, the system comprising:
    a net configured to receive the unmanned aerial vehicle;
    an infrared emitter arrangement including a plurality of infrared emitters arranged around the net;
    an infrared sensor mounted to the unmanned aerial vehicle and configured to detect the infrared emitter arrangement; and
    a processor that is in communication with the infrared sensor and configured to adjust at least one of an azimuth or an elevation of the unmanned aerial vehicle based on the detected infrared emitter arrangement in a field-of-view of the infrared sensor;
    wherein the plurality of infrared emitters includes a reference infrared emitter arranged behind the net relative to a capturing face of the net and proximate a center of the net; and
    wherein the plurality of infrared emitters includes four infrared emitters that are spaced relative to the reference infrared emitter, and that are each arranged at a different corner of the net.

2. The system according to claim 1, wherein each of the plurality of infrared emitters is a light source or a thermal source.

3. The system according to claim 1, further comprising a power source configured to heat each of the plurality of infrared emitters to produce a predetermined amount of thermal emissivity for detection by the infrared sensor.

4. The system according to claim 1, wherein the net is tilted relative to a vertical orientation.

5. A system for capturing an unmanned aerial vehicle, the system comprising:
    a net configured to receive the unmanned aerial vehicle;
    an infrared emitter arrangement including a plurality of infrared emitters arranged around the net;
    an infrared sensor mounted to the unmanned aerial vehicle and configured to detect the infrared emitter arrangement; and
    a processor that is in communication with the infrared sensor and configured to adjust at least one of an azimuth or an elevation of the unmanned aerial vehicle based on the detected infrared emitter arrangement in a field-of-view of the infrared sensor;
    wherein the processor is configured to determine a slant range between the unmanned aerial vehicle and the net based on the field-of-view and distances between the plurality of infrared emitters.

6. The system according to claim 5, wherein the plurality of infrared emitters includes a reference infrared emitter arranged behind the net relative to a capturing face of the net and proximate a center of the net.

7. The system according to claim 6, wherein the reference infrared emitter is arranged in a housing having a shutter for obfuscating the reference infrared emitter from the infrared sensor for predetermined intervals.

8. The system according to claim 6, wherein the plurality of infrared emitters includes two or more infrared emitters that are spaced relative to the reference infrared emitter.

9. The system according to claim 5, wherein the net is tilted relative to a vertical orientation.

10. The system according to claim 5, wherein the processor is configured to adjust at least one of a yaw or a pitch of the unmanned aerial vehicle based on the determined slant range.

11. The system according to claim 5, wherein the processor includes guidance and signal processing logic for determining the slant range and adjusting the azimuth or the elevation of the unmanned aerial vehicle.

12. The system according to claim 11, wherein the net includes logic configured to control the infrared emitter arrangement.

13. The system according to claim 5, further comprising a gimbal arranged to mount the infrared sensor to a nose of the unmanned aerial vehicle.

14. The system according to claim 13, wherein the processor is configured to correct at least one of an elevation or an azimuth of the gimbal to put a reference infrared emitter of the plurality of infrared emitters in boresight.

15. The system according to claim 5, wherein the infrared sensor is configured to view the infrared emitter arrangement for a predetermined number of frames before the processor adjusts the azimuth or the elevation.

16. A method for capturing an unmanned aerial vehicle in a net, the method comprising:
    detecting an infrared emitter arrangement arranged proximate the net in a field-of-view of an infrared sensor arranged on the unmanned aerial vehicle;
    adjusting at least one of an azimuth or elevation of the unmanned aerial vehicle based on the detected infrared emitter arrangement in the field-of-view; and determining a slant range between the unmanned aerial vehicle and the net based on the field-of-view of the infrared sensor and distances between the plurality of infrared emitters.

17. The method according to claim 16 further comprising adjusting at least one of a yaw or a pitch of the unmanned aerial vehicle based on the determined slant range.

18. The method according to claim 16 further comprising adjusting at least one of an elevation or azimuth of a gimbal and sensor arrangement on the unmanned aerial vehicle to put a reference infrared emitter of the infrared emitter arrangement in boresight after an initial detection of the infrared emitter arrangement.

19. The method according to claim 18 further comprising obfuscating the reference infrared emitter for predetermined intervals during detection to determine a position of the infrared emitter arrangement in the field-of-view.

* * * * *